Figure 1:
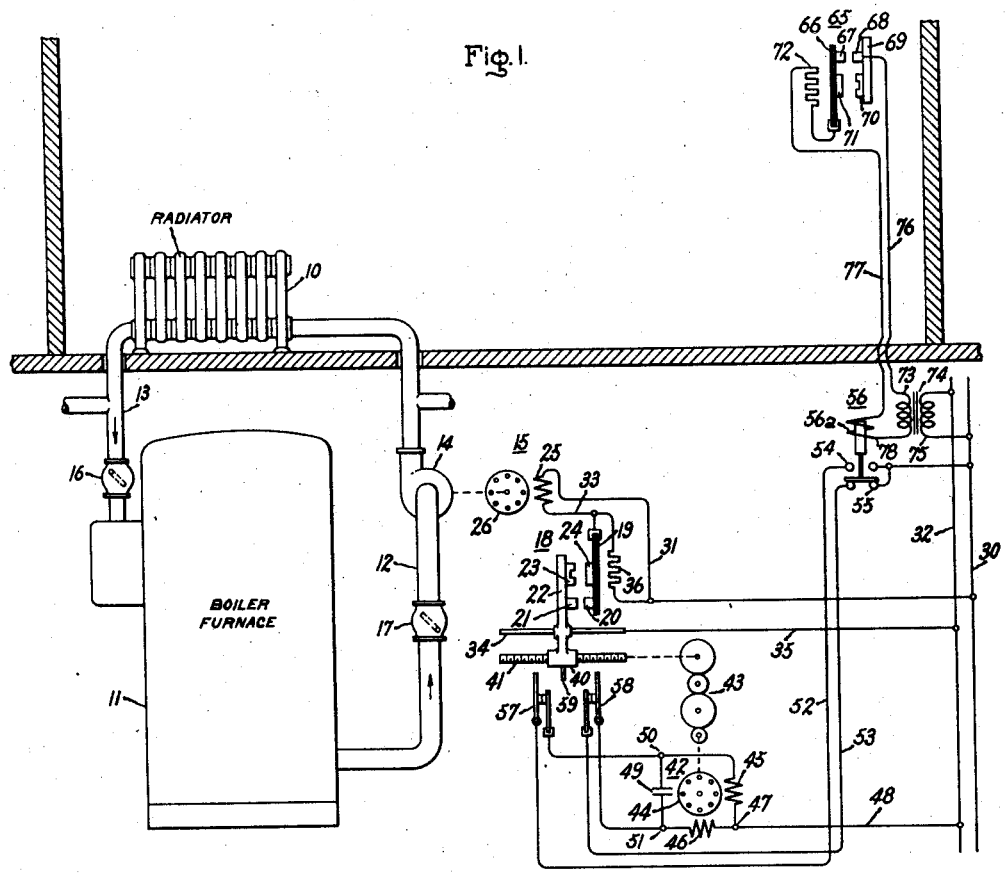

Nov. 10, 1942.  E. W. ROESSLER  2,301,708
TEMPERATURE CONTROL SYSTEM
Filed Feb. 25, 1941

Inventor:
Edward W. Roessler,
by Harry E. Dunham
His Attorney.

Patented Nov. 10, 1942

2,301,708

UNITED STATES PATENT OFFICE 2,301,708

TEMPERATURE CONTROL SYSTEM

Edward W. Roessler, Caldwell, N. J., assignor to General Electric Company, a corporation of New York Application February 25, 1941, Serial No. 380,471

2 Claims. (Cl. 236—68)

My invention relates to control systems and more particularly to temperature control systems of the type wherein the output of temperature changing apparatus is regulated by a thermostatically controlled "on-off" type of regulating device.

In the art of temperature controlling it is common to use an "on-off" type of thermostatic control for regulating the output of temperature changing apparatus for the purpose of maintaining a uniform temperature in an enclosure or space to be heated or cooled. For example, it is common to provide a space thermostat movable between "hot" and "cold" positions in response to temperature deviations from a predetermined value to start or stop the operation of temperature changing apparatus. An inherent difficulty with this type of control is that the controlled temperature tends to "hunt" or "overshoot" due to the large thermal storage effect generally present in heating or cooling systems. This tendency to "hunt" or "overshoot" can be greatly reduced by the use of a proportioning or oscillating type thermostat which operates to cause intermittent operation of the temperature changing apparatus, the relative lengths of operating and non-operating periods being variable in accordance with the controlled temperature. For example, an ordinary thermostat may be made to give a proportioning control action by providing it with an auxiliary electric heater which is energized when the thermostat is in the "cold" position and deenergized when the thermostat is in the "hot" position whereby the thermostat is caused to continuously oscillate or cycle.

However, the proportioning thermostat, as it has been used in previous temperature control systems of the "on-off" type, has the disadvantage that the controlled temperature tends to "droop" or drift as the load on the system changes due to the fact that there is a fixed relation between the controlled temperature and the output of the temperature changing apparatus.

It is an object of my invention to provide an improved concatenated variable timing thermostat and variable intermittent time switch "on-off" type of temperature control system.

It is a further object of my invention to provide a temperature control system utilizing a proportioning or continuously oscillating type of intermittent "on-off" thermostat in conjunction with a continuously operating variable intermittent timing switch "on-off" type of control which will maintain a uniform temperature irrespective of load conditions.

Another object of my invention is to provide a temperature control system of the above concatenated "on-off" type in which the rate of change of average output of the temperature changing apparatus is proportional to the deviation of the controlled temperature from a predetermined value whereby any tendency of the controlled temperature to "hunt" or "overshoot" is obviated.

Further objects and advantages of my invention will become apparent as the following description proceeds and the features of novelty which characterize my invention will be pointed out with particularity in the claims annexed to and forming a part of this specification.

According to my invention the output of the temperature changing apparatus is controlled by means of a two position or "on-off" regulating device and a variable timing means is provided for intermittently moving the regulating device from one control position to the other. Associated with the regulating device is a timing control element operable to vary according to its position between maximum and minimum output limits, the relative lengths of the periods of time the regulating device remains in each control position whereby the average output of the temperature changing apparatus is a function of the position of the control element. A floating or continuously operating reversible operator is provided for positioning the control element and the intermittent reversing of the continuously moving operator is controlled by means of a proportioning or continuously oscillating variable timing thermostat responsive to the controlled temperature. The operation of the proportioning thermostat is such that the control element continuously oscillates back and forth and when the controlled temperature is at the desired value the mean position of the control element remains constant. However, upon a deviation of the controlled temperature from a predetermined value the control element moves in oscillating progression in a direction to decrease the deviation and at a rate proportional to the deviation whereby any tendency of the system to "hunt" or "overshoot" or for the controlled temperature to "droop" or "drift" with changes in load is precluded.

Figure 2:
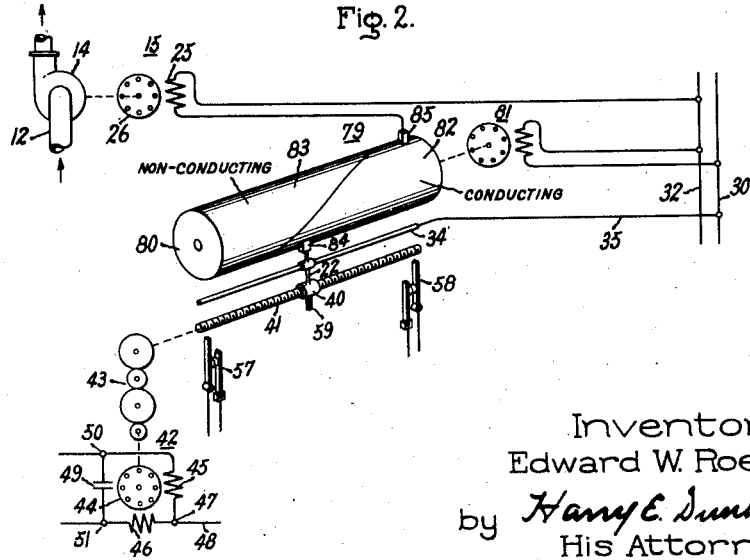

My invention will be better understood from the following description taken in connection with the accompanying drawing in which Fig. 1 illustrates in diagrammatic form one embodiment of my invention and Fig. 2 is a modification of the arrangement shown in Fig. 1.

For the purpose of illustrating a specific embodiment of my invention I have shown in Fig. 1 of the drawing a heat exchanger or radiator 10 for supplying heat to a space, the temperature of which is to be controlled. The radiator is supplied with a suitable heating fluid such as hot water from a boiler furnace 11 through a supply conduit 12, the heating fluid being returned to the boiler through a return conduit 13. A circulating pump 14 driven by a suitable motor 15 is provided for circulating heat transfer fluid between the boiler 11 to the radiator 10. The temperature of the heating fluid supplied from boiler 11 is maintained within predetermined limits by any conventional means not shown.

If desired, check valves 16 and 17 may be provided to prevent thermo-siphon circulation of the heating fluid when the pump 14 is not in operation.

For the purpose of varying the average output or temperature changing effect of the radiator 10 the circulating pump motor 15 is intermittently energized and deenergized at variable time intervals by means of a thermally actuated variable intermittent "on-off" timing switch indicated generally at 18. The switch 18 comprises a bimetallic member 19 which is fixed at one end and carries at its free end a contact 20. Cooperating with contact 20 is a contact 21 mounted upon a control element or arm 22, the position of which is adjustable by means of a floating operator as will be more fully described below. Also mounted on the arm 22 is a permanent magnet 23 which is located in attractive relation with an armature 24 mounted on the bimetallic member 19. The action of the magnet is such that there is a predetermined differential between the switch opening and closing temperatures.

The motor 15 which may be of any suitable type has been illustrated as of the induction type comprising a field winding 25 and an armature 26. One terminal of the motor field winding is connected directly to a power supply conductor 30 by means of a conductor 31. The other terminal of the motor field winding is connected to a supply conductor 32 by a circuit comprising the conductor 33, the bimetallic member 19, contacts 20 and 21, the arm 22, the slide contact 34 and the conductor 35.

In order to cause the timing switch 18 to continuously cycle between the open and closed contact positions, an auxiliary heater 36 is arranged in heat transfer relation with the bimetallic member 19 and is connected across the conductors 31 and 33 so as to be energized concurrently with the motor 15. It is necessary that the heater 36 have sufficient heating capacity when energized to raise the temperature of the bimetallic member 19 to a temperature at which the switch contacts will snap open in order to obtain a cyclic action of the timing switch. When the timing switch is in the cold position the contacts 20 and 21 are closed to complete an energizing circuit to the motor 15 and the heater 36. When the heater 36 has heated the bimetallic member 19 to a predetermined temperature it will snap to the right opening contacts 20 and 21 and deenergizing the heater 36 and the motor 15. If the control element 22 carrying contact 21 is moved to the right, the closed contact time of the timing switch 18 increases due to the fact that the contact opening temperature is higher and therefore the heater 36 must be energized a longer period of time to raise the bimetallic member 19 to the opening temperature. Therefore, the per cent running time of the motor 15 and pump 14 is increased causing a corresponding increase in the average heat output of radiator 10. Conversely, if the control element 22 is moved to the left, the closed contact time of the timing switch 18 decreases causing a corresponding decrease in the running time of pump 15 and the average heat output of the radiator 10. Hence, by varying the relative lengths of the on and off periods of the circulating pump 14 the control element 22 acts as a regulating device for controlling the average output of the radiator 10.

The position of the control element or arm 22 is controlled by means of a floating or continuously operating reversible operator and a proportioning or continuously oscillating variable "on-off" timing thermostat which will now be described. The floating operator comprises a nut 40 which is attached to the arm 22. The nut 40 rides in threaded engagement with a screw 41 which is driven by means of a reversible motor 42 through suitable reduction gearing 43. The reversible motor 42 may be of any suitable type and has been illustrated as a condenser induction type comprising a rotor 44 and a pair of field windings 45 and 46. The common terminal 47 of the field windings is permanently connected to the supply conductor 32 by the conductor 48. A condenser 49 is shunted across the field terminals 50 and 51, the arrangement being such that when the terminal 50 is connected to the other power supply conductor 30 the motor rotates in one direction and when the terminal 51 is connected to the supply conductor 30 the motor rotates in the opposite direction. The motor terminals 50 and 51 are arranged to be selectively connected by the conductors 52 and 53 to the supply conductor 30 through the normally open contacts 54 and normally closed contact 55 of a control relay 56. Thus, when the control relay 56 is deenergized an energizing circuit is completed through the contacts 55 causing the motor 42 to rotate in one direction and when the relay is energized a circuit is completed through the contacts 54 causing the motor to rotate in the opposite direction. Limit switches 57 and 58 may be connected in series with the conductors 52 and 53 to prevent overtravel of the nut 40 in either direction. These limit switches are arranged to be actuated by means of a member 59 projecting from the nut 40.

The energization of the operating coil 56a of the control relay 56 is controlled by means of a proportioning thermostat indicated generally at 65 and located so as to be affected by the temperature of the space that is supplied with heat by the radiator 10. As illustrated, the proportioning thermostat may comprise a bimetallic member 66 which is fixed at one end and carries at its free end a movable contact 67. The contact 67 cooperates with a stationary contact 68 mounted upon a fixed support 69. Also attached to the support 69 is a permanent magnet 70 which in cooperating with an armature 71 mounted upon the bimetallic member 66 acts to give the thermostat a temperature differential of operation so that it snaps to open and closed contact positions at spaced predetermined temperatures. Located in heat transferring relation with the bimetallic member 66 is an auxiliary heater 72. The heater 72 is connected to be energized when the proportioning thermostat is in the closed contact or low temperature position and deenergized when the thermostat is in the open contact or high temperature position. The heater 72 has sufficient heating capacity when energized to raise the temperature of the bimetallic member 66 to the open contact or high temperature position whereby the thermostat contacts intermittently move to the open and closed contact positions. The auxiliary heater 72 and the operating coil 56a are connected in a series circuit including the contacts 67 and 68 of the proportioning thermostat and are energized from the secondary winding 73 of a suitable step-down transformer 74 having a primary winding 75 connected to the supply conductors 30 and 32. The circuit may be traced as follows: one terminal of the secondary winding 73, the conductor 76, contacts 67 and 68 of the thermostat 65, bimetallic member 66, the auxiliary heater 72, the conductor 77, the operating coil 56a of the control relay 56, conductor 78 and the other terminal of the secondary winding 73.

When the contacts of the proportioning thermostat 65 are in the closed position the relay 56 is energized and an energizing circuit is completed through the contacts 54 causing the motor 42 to rotate in a direction to drive the control element 22 to the right or temperature increasing position. When the contacts of the proportioning thermostat are open the relay 56 is deenergized and an energizing circuit is completed through the contacts 55 causing the motor to rotate in the opposite direction and move the control element to the left or temperature decreasing position.

The characteristics of a proportioning thermostat are such that an intermittent timing cyclic action occurs, the contacts remaining in the open and closed positions for time intervals the relative length of which are oppositely variable in accordance with opposite deviations of the space temperature from a predetermined value. The control element 22 therefore oscillates continuously in accordance with the operation of the proportioning thermostat. The proportioning thermostat is set so that when the space temperature is at a predetermined value to be maintained the contacts remain in open and closed positions equal periods of time whereupon the control element 22 travels equal distances in opposite directions its mean position remaining constant. Thus when the space temperature is at the predetermined desired value the proportioning thermostat 65 equalizes the length of time that the reversible motor 42 is operated intermittently in opposite directions and thereby maintains the average output of the heating apparatus substantially constant at any value between its minimum and maximum output limits. When the space temperature increases above the predetermined value the open contact time of the proportioning thermostat exceeds the closed contact time and consequently the control element 22 moves in oscillating progression to the left or temperature decreasing position. On the other hand when the space temperature falls below the predetermined value the closed contact time of the proportioning thermostat exceeds the open contact time and the control element 22 moves in oscillating progression to the right or temperature increasing position. In this way the proportioning thermostat oppositely unequalizes the lengths of time that the reversible motor 42 is operated in opposite directions upon opposite deviation of the space temperature from the desired predetermined value and thereby oppositely varies the average output of the heating apparatus between its minimum and maximum output limits. The action of the proportioning thermostat and the floating operator is such that the rate of oscillating progression of the control element 22 to the right or left is a function of the deviation of the space temperature from the predetermined value, the rate of oscillating progression being zero when the deviation is zero. Preferably the time required for the floating operator to move the control element 22 through the cycling range of the timing switch 18 when the motor 42 is continuously energized should be approximately five times the cycle time of the proportioning thermostat.

The operation of my temperature control system will now be described.

Let it be assumed that the control element 22 is in a position corresponding to a per cent running time of the circulating pump 14 such that the average heat output of the radiator 10 is sufficient to maintain the space temperature at the desired value. The open and closed contact times of proportioning thermostat will then be equal so that the mean position of the control element 22 remains constant and an equilibrium condition will obtain.

Now, let it be assumed that the space temperature falls below the predetermined value so that the contacts of the proportioning thermostat remain closed a longer period of time than they remain open. The control element 22 will then move to the right or temperature increasing position in oscillating progression so that the per cent time the contacts of the timing switch 18 remain closed or "on" increases. As a result the per cent running time of the circulating pump 14 and hence the average heat output of the radiator 10 also increases. The increased heat supplied by the radiator 10 causes the space temperature to rise and when it returns to the predetermined value the open and closed contact times of the proportioning thermostat will again be equal and the mean position of the control element 22 will remain constant at a new equilibrium position.

Now, let it be assumed that the space temperature rises above the predetermined value so that the closed contact time of the proportioning thermosat is less than the open contact time. The control element 22 will then move in oscillating progression to the left or temperature decreasing position so that the contacts of the timing switch 18 remain in the closed or "on" position a shorter period of time. Consequently, the per cent running time of the circulating pump 14 and hence the average output of the radiator 10 will decrease and less heat will be supplied to the space. As a result the space temperature will fall and when it reaches a predetermined value the open contact time of the proportioning thermostat will again equal the closed contact time and the mean position of the control element 22 will again remain constant at a new equilibrium position. Thus, it is seen that the apparatus functions automatically to control the output of the radiator 10 to maintain the space temperature at the desired value.

It is important to note that there is no fixed relation between the space temperature and the rate of output of the radiator 10, as determined by the position of the control element 22, with the result that there is no tendency of the space temperature to drift or droop with different load conditions.

Another important aspect of my invention is the fact that the rate of oscillating progression of the control element 22 and hence the rate of change of the average output of the radiator or heating element 10 is a function of the space temperature deviation from a predetermined space temperature to be maintained. Hence as the space temperature approaches the desired value the rate of correction correspondingly decreases with the result that any tendency of the system to hunt or overshoot is avoided.

In Fig. 2 of the drawing a modified form of timing switch 79 is shown for controlling the per cent running time of the pump motor 15. As illustrated, the timing switch 79 comprises a drum or cylinder 80 which is continuously rotated by means of a suitable motor 81 energized from the supply conductors 30 and 32. The surface of the cylinder 80 is of composite construction, the portion 82 being electrically conducting and the portion 83 being non-conducting. A movable brush 84 engages the surface of the drum 80 and is arranged to be moved axially back and forth by means of the control element 22. As the drum rotates a fixed brush 85 always engages the conducting portion of the drum. The movable brush 84, however, engages first a conducting and then a non-conducting surface of the drum. The energizing circuit of the pump motor 15 is connected in series with the brushes 84 and 85 so that when the brush 84 contacts the conducting portion 82, the motor energizing circuit is completed but when the brush contacts a non-conducting portion 83 the circuit is broken. The layout of the conducting and non-conducting surfaces of the drum 80 is such that when the control element 22 moves the brush 84 to the right the per cent running time of the motor 15 is gradually increased and as the brush is moved to the left the per cent running time of the motor is gradually decreased. Thus it is seen that the timing switch 79 will perform the same function as the thermally actuated timing switch 18 illustrated and described in the Fig. 1 arrangement.

While I have shown my control system as applied to a hot water heating system in which the on-off control element is a circulating pump, it will be understood that it may be applied to temperature changing apparatus having any form of on-off type of control without departing from my invention in its broader aspects. For example, my invention might be used to control the on-off operation of an oil burner, refrigeration apparatus etc. It is to be noted that the term "on-off" type of control is intended to embrace a two position type of control wherein a regulating element moves between high and low output rates not necessarily completely "on" or "off."

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a temperature control system, space temperature changing apparatus having an electric driving motor, means for alternately energizing and deenergizing said driving motor including a first variable intermittent timing switch connected to control the energization of said driving motor and having a timing control element movable each way between predetermined timing limits for oppositely varying the lengths of time said driving motor is maintained energized and deenergized whereby the average output of said apparatus may be varied correspondingly between maximum and minimum output limits, means including a reversible electric control motor for moving said timing control element each way between said predetermined timing limits, and intermittent reversing means for alternately operating said control motor in opposite directions including a second variable intermittent timing switch mechanism having a thermostatic timing control element responsive to the temperature of said space for equalizing the lengths of time said control motor is operated alternately in opposite directions when said space temperature is at a predetermined value and thereby maintaining the average output of said temperature changing apparatus substantially constant at any value between said minimum and maximum output limits and for oppositely unequalizing the lengths of time said control motor is operated alternately in opposite directions upon opposite deviations of said space temperature from said predetermined value and thereby varying the average output of said temperature changing apparatus between said output limits.

2. In a temperature control system, space temperature changing apparatus having an electric driving motor, means for alternately energizing and deenergizing said driving motor including a first electrically heated thermal responsive intermittent timing switch connected to control the energization of said driving motor and having an electric heater energized and deenergized simultaneously therewith and provided with a timing control element movable each way between predetermined timing limits for oppositely varying the lengths of time said driving motor and heater are maintained energized and deenergized whereby the average output of said apparatus may be varied correspondingly between maximum and minimum output limits, means including a reversible electric control motor for moving said timing control element each way between said predetermined timing limits, and intermittent reversing means for alternately operating said control motor in opposite directions including a second electrically heated thermal responsive variable intermittent timing switch having an electric heater energized and deenergized thereby and provided with a thermostatic timing control element responsive to both the temperature of said heater and the temperature of said space for equalizing the lengths of time said control motor is operated alternately in opposite directions when said space temperature is at a predetermined value and thereby maintaining the average output of said temperature changing apparatus substantially constant at any value between said minimum and maximum output limits and for oppositely unequalizing the lengths of time said control motor is operated alternately in opposite directions upon opposite deviations of said space temperature from said predetermined value and thereby varying the average output of said temperature changing apparatus between said output limits.

EDWARD W. ROESSLER.